UNITED STATES PATENT OFFICE.

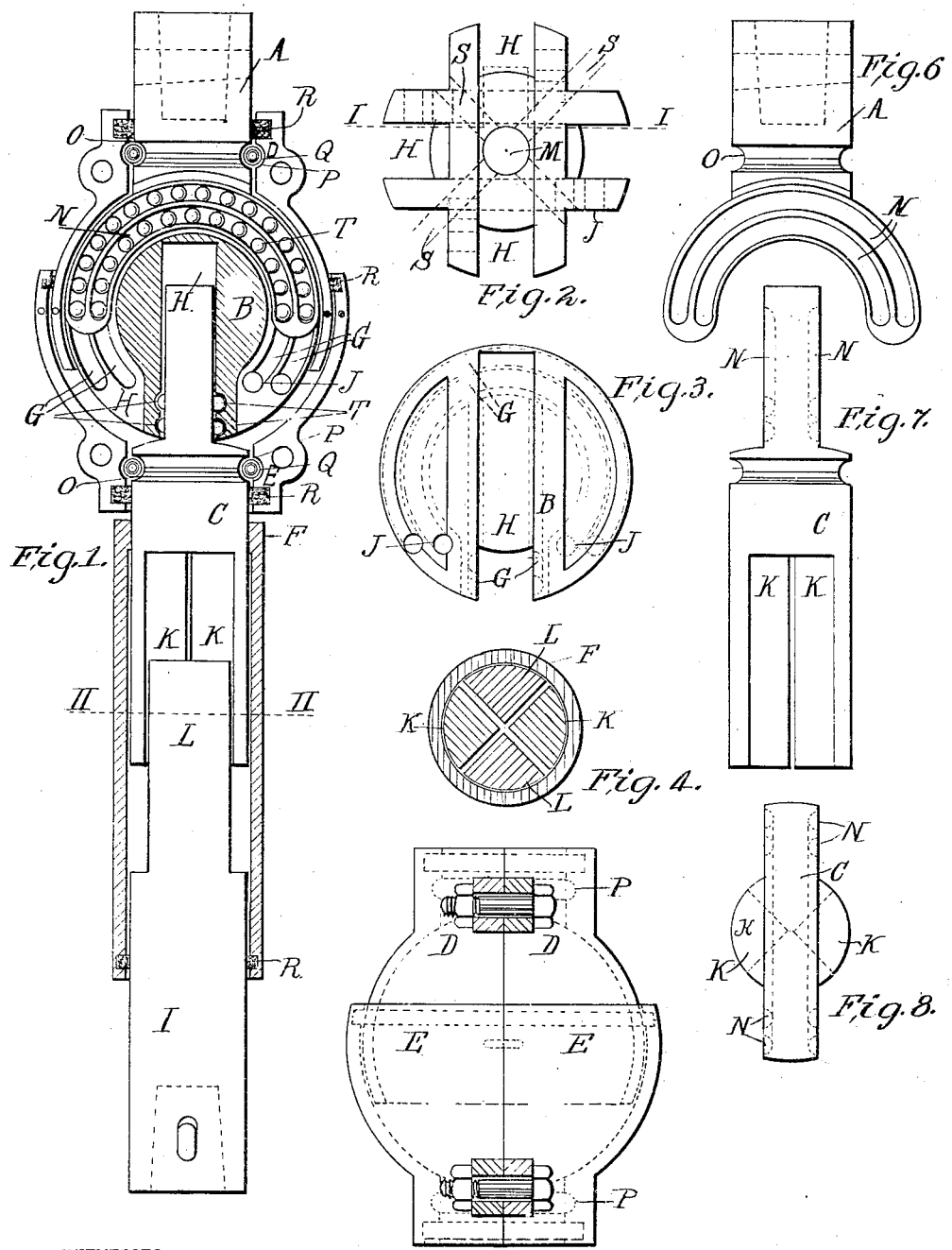

WALTER L. LINDSAY AND SAMUEL D. LINDSAY, OF CHICAGO, ILLINOIS.

BALL-BEARING UNIVERSAL JOINT.

1,159,690.  Specification of Letters Patent.  Patented Nov. 9, 1915.

Application filed December 18, 1911. Serial No. 666,569.

*To all whom it may concern:*

Be it known that we, WALTER L. LINDSAY and SAMUEL D. LINDSAY, citizens of the United States, and residents of Chicago, in the county of Cook and State of Illinois, have invented a new and Improved Ball-Bearing Universal Joint, of which the following is a specification.

Our invention relates to ball-bearing universal joints or flexible couplings with ball-bearing dust-proof housings and our object is to produce a universal joint of this character which shall also have an adequate heavy oil bearing capacity for affording the joint perfect lubrication.

A further object is to produce a joint in which the motion transmitted will be more uniform than in the old-style of joint and all excessive wear and stress obviated.

Other objects of our invention will hereinafter appear and be pointed out in the appended claim and in order that a full understanding of the same may be had reference will be made to the accompanying drawing, in which—

Figure 1, is a sectional view of the coupling parts assembled, the connecting member of the coupling being shown in section along the line I—I of Fig. 2. Fig. 2, is an end view of the ball or connecting member. Fig. 3, is a plan view of the said connecting member. Fig. 4, is a section along the line II—II of Fig. 1. Fig. 5, is a plan view partly in section of the housing members. Figs. 6 and 7 are plan views of the yoke members of the coupling, and Fig. 8 is an end view of one of said yoke members.

Referring to the drawings, the ball connecting member B is formed of general spherical outline but with the metal cut away and holes M and S drilled therethrough as shown in Fig. 2 in order to decrease its weight and form pockets to retain the oil to lubricate the bearings. The connecting member B also has guide grooves H formed therein at right angles to each other and extending almost around the ball, the purpose of which is to receive the adjacent semicircular portions of the yoke members A and C of the coupling. The walls of these grooves H and the adjacent contacting faces of the yoke members are provided with grooves G and N, respectively, forming ball races to receive anti-friction balls T performing the double function of promoting the smooth running action of the joint and the locking of the parts of the joint together. The ball connecting member B is also provided with a hole or opening J for each of the ball races, the balls being inserted when the yokes A and C are turned in such a position as to bring the ends of the races into line with said openings.

The yoke and connecting members are inclosed by a housing formed of sectional members D and E suitably secured together. The housing members and the stem portions of the yokes have complemental grooves P and O respectively forming ball races for antifriction balls Q to facilitate the running of the universal joint within the housing. To form a dust-proof joint as well as to retain the oil therein washers R are interposed between the housing sections and also between the housing and the yokes A and C.

When the housing is in place it limits the angular movement of the yoke members A and C to a degree which will not permit them to register the ends of the ball races with the openings J thereby preventing the balls from escaping through said openings.

The stems of the yoke members are formed with two oppositely disposed triangular portions K which are adapted to mesh slidingly with similarly formed portions L on the adjacent shaft I which permits of the joint being readily and quickly assembled between driving and driven shafts, the jaws K and L locking together for rotation but being relatively movable longitudinally to permit the shaft I to move toward or from the ball B. These shaft coupling parts are inclosed by a sleeve U provided with one or more internal washers R.

From the foregoing it will be apparent that we have produced a ball-bearing universal joint of simple and efficient construction and operation for carrying out the objects of our invention, and while we have illustrated the preferred form of the apparatus, we desire it to be understood that we reserve the right to such modifications and changes as may properly fall within the scope of the appended claim:

We claim:

In a universal joint, a ball-connecting member having peripheral grooves of length greater than a semi-circle and disposed at right angles to each other, and having ball channels of greater length than a semi-circle in the opposite faces of the grooved walls, and a ball inserting hole communicating with the extremity of each channel, shaft sections provided with external ball-channels O, and semi-circular yokes fitting slidingly in said grooves and provided with semi-circular channels complementary to the first-named channels and forming ball-races in conjunction with said first-named channels, balls in said channels for anti-friction purposes and locking the yokes to the ball member, a housing inclosing the ball-member, yokes and channeled portions of the shaft sections, and provided with internal channels coöperating with the channels O, in forming ball-races, and balls in said races for anti-friction purposes and to lock the housing to the shafts; said housing comprising two members having their inner portions overlapping, a packing ring between the overlapping portions and secured to one of them, and packing rings between the housing members outward of the last-named balls and said shafts to exclude dust from access to the said balls.

WALTER L. LINDSAY.
SAMUEL D. LINDSAY.

Witnesses:
W. J. McSweeney,
B. F. Clement.